US010785511B1

United States Patent
Lopez Hernandez et al.

(10) Patent No.: US 10,785,511 B1
(45) Date of Patent: Sep. 22, 2020

(54) CATCH-UP PACING FOR VIDEO STREAMING

(71) Applicant: Amazon Technologies, Inc., Seattle, WA (US)

(72) Inventors: Raul Izahi Lopez Hernandez, San Jose, CA (US); Ilya Vladimirovich Brailovskiy, Los Gatos, CA (US); Qi Keith Wang, Cambridge (GB); Laurent Brisedoux, Cambridge (GB); Manuel Rosendo Arana-Manzano, San Jose, CA (US); Michiel Josias de Kock, Cambridge (GB)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 74 days.

(21) Appl. No.: 15/812,989

(22) Filed: Nov. 14, 2017

(51) Int. Cl.
*H04N 21/2343* (2011.01)
*H04N 19/164* (2014.01)
*G06K 9/00* (2006.01)
*H04N 5/232* (2006.01)

(52) U.S. Cl.
CPC . *H04N 21/234381* (2013.01); *G06K 9/00711* (2013.01); *H04N 5/23251* (2013.01); *H04N 19/164* (2014.11)

(58) Field of Classification Search
CPC ......... H04N 21/234381; H04N 19/164; H04N 5/23251; G06K 9/00711
See application file for complete search history.

(56) References Cited

U.S. PATENT DOCUMENTS

| 2006/0095199 | A1* | 5/2006 | Lagassey | G07C 5/008 701/117 |
| 2007/0133405 | A1* | 6/2007 | Bowra | H04L 43/00 370/230 |
| 2008/0040453 | A1* | 2/2008 | Cohen | H04N 7/16 709/219 |
| 2009/0115570 | A1* | 5/2009 | Cusack, Jr. | G07C 9/00103 340/5.2 |
| 2013/0212166 | A1* | 8/2013 | Willig | H04L 65/1016 709/203 |
| 2014/0078304 | A1* | 3/2014 | Othmer | G08G 1/20 348/148 |

(Continued)

*Primary Examiner* — Michael J Hess
(74) *Attorney, Agent, or Firm* — K&L Gates LLP

(57) ABSTRACT

Techniques are generally described for catch-up pacing for video streaming. In various examples, a camera may capture first video data representing a physical environment. In some examples, motion in the physical environment may be detected from the first video data. A communication channel may be established with a remote computing device. In some examples, the camera may capture second video data. In various examples, the second video data may be captured during a period of time corresponding to the establishment of the communication channel. An available bandwidth of the communication channel may be determined. The available bandwidth may comprise a first bitrate. Third video data may be captured by the camera. The third video data may be encoded at a second bitrate lower than the first bitrate. The first video data, second video data and third video data may be sent to the remote computing device.

20 Claims, 7 Drawing Sheets

(56) References Cited

U.S. PATENT DOCUMENTS

| | | | |
|---|---|---|---|
| 2014/0269359 A1* | 9/2014 | Roskind | H04L 43/0882 370/252 |
| 2016/0182906 A1* | 6/2016 | Panchagnula | H04N 19/124 375/240.03 |
| 2018/0091569 A1* | 3/2018 | Roth | H04N 21/2143 |

* cited by examiner

CATCH-UP PACING FOR VIDEO STREAMING

BACKGROUND

Video data may be sent between computing devices over a network. In some examples, videos may be encoded by an encoding computing device, separated into packets, sent to a recipient computing device, decoded and played back while subsequent portions of the video are still being transmitted to the client computing device by the encoding computing device. Such video transmission and playback is often referred to as "streaming". In some other examples, videos data may be encoded by a server and sent to one or more remote computing devices for further processing. Network conditions can change during transmission of video for various reasons, and may sometimes deteriorate to an extent causing delays in streaming of video data. Conversely, in some examples, network conditions may ameliorate leading to additional link capacity beyond current usage. In some examples, computing devices may adjust characteristics of the video stream in order to compensate for changing network conditions. For example, encoding computing devices may adjust the bitrate of the video stream to account for a change in bandwidth.

DETAILED DESCRIPTION

Figure 1:
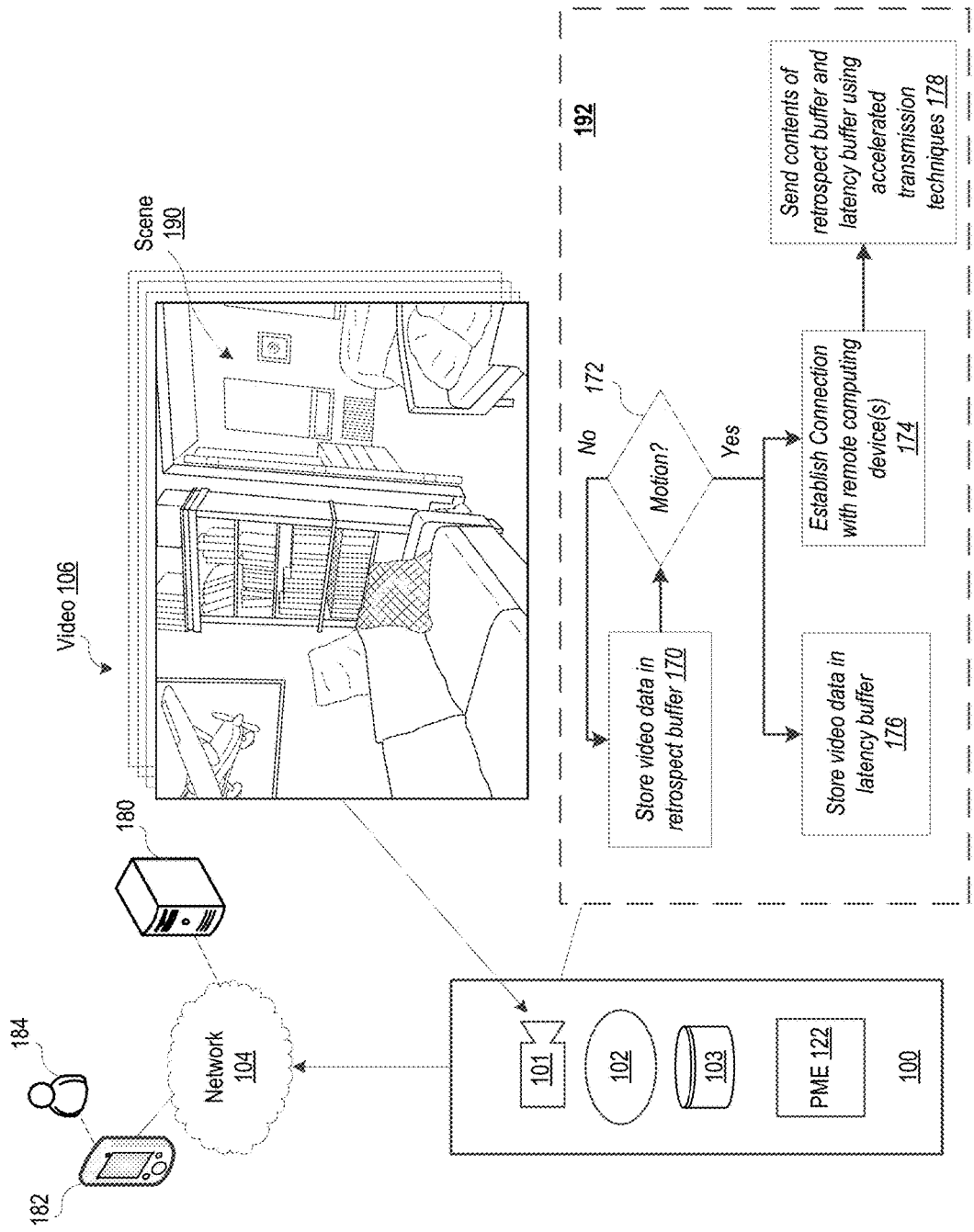
FIG. 1 depicts a system effective to perform catch-up pacing for video streaming, in accordance with various embodiments of the present disclosure.

In the following description, reference is made to the accompanying drawings, which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Video may be encoded with various transmission attributes (e.g., bitrates, resolutions, profiles, frame rates, etc.) prior to sending the video over a network to a remote computing device. Web Real-Time Communication ("WebRTC") comprises a number of communication protocols and application programming interfaces ("APIs") that enable real-time communication over peer-to-peer connections. WebRTC may use Real-time Transport Protocol ("RTP") to transmit audio and/or video over a network.

Techniques for WebRTC and video streaming generally are described herein. In digital video technology, a video may be represented by a number of video frames that may be displayed in sequence during playback. A video frame is comprised of rows and columns of pixels. The resolution of a particular video frame is described by the width of the frame, in terms of a first number of pixels, and by the height of the frame, in terms of a second number of pixels. Video frames may be compressed using different picture types or frame types, such as intra-coded picture frames ("I-frames"), predicted picture frames ("P-frames"), and/or bi-directional predictive frames ("B-frames"). The term "frame" can refer to an entire image captured during a time interval (e.g., all rows and columns of pixels comprising the particular image). The term "picture" can refer to either a frame or a field. A "field" is a partial image of a frame, which can be represented by either the odd-numbered or even-numbered scanning lines of the frame. Reference frames are frames of a compressed video that are used to define future or past frames. A compressed video may comprise one or more frames that do not include all of the pixel data within the frames themselves, but rather reference pixel values of other frames (e.g., reference frames). I-frames include detailed pixel data in order to be self-decodable and to provide reference pixel values for other I-frames. As a result, I-frames do not require other video frames in order to be decoded, but provide the lowest amount of data compression and accordingly, typically require more to send over a network relative to other frame types. P-frames contain only the changes in the pixel values from previous frames, and therefore P-frames use data from previous frames to decompress and decode the P-frame. As a result, P-frames are more compressible than I-frames and require less bandwidth to transmit. B-frames can be decoded using both previous and forward frames for data reference.

As used herein, the "size" of a frame may refer to the amount of memory needed to store a particular compressed frame and/or the amount of available bandwidth required to transmit the compressed frame. In at least some examples, frames with higher resolution (e.g., more pixels in the two-dimensional grid of the frame) may be larger in size relative to a lower resolution frame. In some further examples, source video content with higher complexity (e.g., content with higher spatial complexity and/or higher motion content (e.g., temporal complexity)) may be encoded into frames of larger size as the frames may require more bits to encode relative to a less complex frame. In various examples, the complexity of a frame or group of frames may refer to the amount of bits required to encode the frame. As such, the frame size may be an indicator of the complexity of a frame. Frame complexity may be estimated using various methods and may be estimated prior to encoding a frame to generate a compressed frame. For example, raw, uncompressed frames of video data may be high-pass filtered in order to determine a spatial complexity of the frame. Generally, the spatial complexity may refer to an amount of entropy of transformed pixel data included within a frame. Higher spatial complexity generally indicates that more detailed and complex pixel data is present in the frame. The spatial complexity may be correlated to the compressed size of the frame. After the spatial complexity of a frame is determined, an estimated compressed size of the frame may be determined for a given quantization parameter based on the spatial complexity prior to compression of the frame. Accordingly, if the estimated frame size is smaller or larger than desired the quantization parameter used to compress the frame may be adjusted accordingly prior to encoding the frame. In various examples, the spatial complexity may be used as a proxy for estimated frame size. In other words, the spatial complexity value of a particular frame (e.g., an I-frame) may be compared with a spatial complexity threshold value (or tolerance) for a particular quantization parameter to determine if the current quantization parameter will result in a compressed frame that is either too large or too small. Adjustment of the quantization parameter may, in turn, affect the compressed frame size with higher quantization parameters resulting in smaller compressed frame sizes and lower quantization parameters resulting in larger compressed frame sizes. In various other examples, the complexity of raw, uncompressed frames of video data may be estimated using a linear regression. In various other examples, decreasing and/or increasing quantization parameters due to rate control may provide an indication of changing in-scene complexity.

Video streams of encoded pictures and/or frames may be encoded into groups of pictures ("GOPs"), and each GOP may begin with an intra-coded frame (I-frame) followed by one or more P-frames and/or B-frames. An I-frame may be referenced by subsequent inter-coded frames of the GOP, as described in further detail below. In at least some examples, I-frames may cause all reference pictures in the DPB (decoded picture buffer) to be flushed, so that no subsequent video frames can reference any frame of image data prior to the I-frame. This means that each GOP is self-decodable (i.e., doesn't depend on reference frames in previous GOPs). A GOP may set forth the length (in terms of a number of frames) and ordering of frames of a video. An average GOP size may refer to the average number of frames in GOPs encoded by the encoder during a particular period of time. An I-frame typically indicates the beginning of a GOP, followed by one or more P-frames and/or one or more B-frames. Image data representing frames and GOPs may be separated into packets according to RTP for transmission over a network to one or more other computing devices.

In various examples described herein, an electronic device including a camera, such as an indoor monitoring system, may be effective to capture video representing a physical environment. The device may continually store a small amount of the captured video (e.g., 2 seconds, 1.5 seconds, 4 seconds, or any suitable time period of video) in a retrospect buffer. The device may monitor the video data stored in the retrospect buffer for indications of motion or other triggering events in the physical environment. If no motion is detected, the contents of the retrospect buffer may be continually deleted (e.g., "flushed") in favor of newly recorded video data, such that the contents of the retrospect buffer represent the most recent video captured by the device at a given point in time. In various examples, if motion is detected, the device may establish a WebRTC connection (or other suitable connection) with one or more remote computing devices. In some examples, while the network connection is being established, the device may store incoming video captured by the camera in a latency buffer. While video is being stored in the latency buffer during network connection, the contents of the retrospect buffer may be kept. In other words, upon detection of motion, the device may keep the current contents of the retrospect buffer and may begin storing incoming video data captured by the camera in the latency buffer. After the network connection is established with one or more remote computing devices the contents of the retrospect buffer and the contents of the latency buffer may be sent to the one or more remote computing devices. In various examples described below, various acceleration techniques may be used to accelerate the transmission of the contents of the retrospect buffer and the latency buffer to "catch up" the video stream so that a real-time video stream may be provided by the device to the remote computing devices. Thereafter, the device may continue to transmit video data captured by the camera to the one or more remote computing devices in order to provide a "live stream" of the environment monitored by the device. Although typically termed a "live stream" it will be appreciated that various delays due to network congestion, latency, packet loss, etc. may still occur.

FIG. 1 is a diagram showing an example system 100, arranged in accordance with various aspects of the present disclosure. In various examples, system 100 may comprise an electronic device including a camera 101, one or more processing elements 102, and a memory 103. In various examples, memory 103 may comprise the various buffers described herein, including the retrospect buffer, latency buffer, pacer buffer, etc., as well as other types of memory effective to store executable instructions and/or other data. In some further examples, system 100 may include a pre-motion estimator (PME) 122. PME 122 may be effective to determine motion data in frames of video data. For example, PME 122 may be effective to match corresponding blocks of pixels between two or more frames of a video 106. Additionally, in some examples, PME 122 may be effective to determine motion vectors between matching blocks and/or to determine the sum of absolute differences (SAD) and/or the sum of squared differences (SSD) between matching blocks of pixels. In some embodiments, the system 100 can be utilized for surveillance or home security.

Camera 101 may include, for example, a digital camera module. The digital camera module may comprise any suitable type of image sensor device or devices, such as a charge coupled device (CCD) and/or a complementary metal-oxide semiconductor (CMOS) sensor effective to capture image data from a local environment of camera 101. For example, camera 101 may include one or more lenses and may be positioned so as to capture images of a portion of the environment disposed along an optical axis (e.g., a light path) of camera 101. In the example depicted in FIG. 1, camera 101 may be positioned so as to capture video 106 (e.g., frames of image data) representing an in-door environment (e.g., scene 190—a portion of an interior of the user's home). Camera 101 may be a dual mode camera device effective to operate in a day mode and a night mode. During day mode operation (sometimes referred to as "RGB mode" operation), an IR cut filter may be interposed in the light path of camera 101 to block infrared light from reaching an image sensor of camera 101. While in day mode, an image signal processor (ISP) of the camera 101 may adjust various parameters of the camera 101 in order to optimize image quality for image data captured in day mode. For example, the frame rate of a video capture mode of camera 101 may be increased when switching from night mode to day mode.

During night mode operation (e.g., IR mode), the IR cut filter may be removed from the light path of camera 101. Accordingly, camera 101 may detect infrared wavelength light in the infrared portion of the spectrum as well as other portions of the electromagnetic spectrum. In some examples, camera 101 may comprise an infrared light source effective to emit infrared light to illuminate the scene 190 while in night mode. In some other examples, camera 101 may be configured in communication with an external infrared light source. In various examples, camera 101 and/or system 100 may cause an infrared light source to emit infrared light when camera 101 operates in night mode. Similarly, in various examples, when camera 101 is operated in day mode, infrared light emission by an infrared light source may be discontinued. In some examples, system 100 may be effective to determine an ambient light level of the environment and may switch between day mode and night mode operation based on the ambient light level. Various parameters may be adjusted as system 100 transitions between day mode and night mode. Additionally, the automatic exposure (AE) of camera 101 may change in response to different detected ambient light levels.

In various examples, one or more of the image processing techniques described herein may be performed by a processing element 102 included within a housing of system 100, which may be positioned at the location where the images are being acquired by the camera 101. In other examples, one or more of the image processing techniques described herein may be performed by a computing device accessible via a communications network, such as computing device 180 accessible over network 104. Accordingly, as depicted in FIG. 1, in some examples, system 100 may send image data over network 104 to one or more computing devices 180 for image processing and/or for access by various computing devices such as user device 182 associated with user 184. In other examples, system 100 may comprise one or more processors and/or a memory effective to perform the various image processing techniques described herein. In various examples, the techniques described herein may be used to catch-up video streaming to a real-time or "live" state. Catch-up video streaming, as described herein, may comprise using unused network channel bandwidth to send and thereby eliminate a backlog of video data stored in various buffers on system 100. In various examples, after elimination of the backlog of buffered video data, data subsequently sent by system 100 to one or more computing devices 180 may represent the most recent video captured by camera 101 and encoded by an encoder of system 100. Accordingly, after elimination of the backlog of buffered video data, video data streamed to one or more computing devices 180 may be described as "live" or "real-time". Of course, there may still be some transmission delay, link latency, processing delay (e.g., compression, packetization) between the time at which video data is captured and the time at which the same video data is received by one or more remote computing devices 180. Use of the terminology "live streaming" and/or "real-time" herein is intended to account for such delays.

In various examples, remote computing device(s) 180 may perform action recognition image processing, human detection, pet detection, and/or other image processing techniques. Additionally, in at least some examples, remote computing device(s) 180 may provide video data received from system 100 to user device 182. In some other examples, remote computing device(s) 180 may make video data received from system 100 accessible by a user device 182 associated with system 100. For example, user 184 may own system 100. A companion application of system 100 may be executed by user device 182 of user 184. In various examples, user 184 may access video data streamed to remote computing device(s) 180 via the companion application and/or via a web browser.

In various examples, video of scene changes in scene 190 and/or significant motion in scene 190 may be streamed to the remote computing device(s) 180 and may be available for viewing by user 184. Scene 190 may represent a portion of a physical environment. For example, in FIG. 1, scene 190 is an interior of an apartment or other dwelling. In various examples, video may be made available to user 184 through a companion application to system 100 and/or through a browser-based system. Additionally, in at least some examples, scene discontinuity determined to be due to illumination changes, compression artifacts, and/or minor motion (e.g., curtains blowing in wind, ceiling fans, etc.) may be disregarded and may not trigger system 100 and/or computing devices 180 to stream video to remote computing device(s) 180. In at least some examples, remote computing device(s) 180 and/or system 100 may send an alert to user device 182 upon detection of motion in scene 190. In various examples, user 184 may receive the alert through the companion application of system 100.

Network 104 may be, for example, the internet, an intranet, a wide area network, a local area network, or the like. In some examples, system 100 may be effective to send and receive data over network 104. The one or more processing elements 102 of system 100 may be effective to execute one or more instructions stored in memory 103 to cause the one or more processing elements 102 to execute various methods as described in further detail below. In FIG. 1, examples of a process flow 192 that may be executed by the one or more processing elements 102 are depicted within a dashed box to indicate that actions in process flow 192 may be executed by one or more components of system 100.

In some examples, process flow 192 may begin at action 170, "Store video data in retrospect buffer". While system 100 is powered on and operational, camera 101 may be programmed to continually capture video data. The most recently captured video data may be stored in a retrospect buffer. The retrospect buffer may store a comparatively small amount of video data. For example, the retrospect buffer may store 2 seconds of video data. In various other examples, retrospect buffer may store other amounts of video data, depending on the desired implementation. Similarly, in some examples, the retrospect buffer may store a certain amount of video data (e.g., 1 MB, 500 kB, etc.). After reaching capacity, the retrospect buffer may delete the oldest video data stored and replace it with the newest video data captured by camera 101. Accordingly, in the example where the retrospect buffer stores 2 seconds of video, at any given time the contents of the retrospect buffer may represent the most recent 2 seconds of video data captured by camera 101. In various examples, retrospect buffer may store compressed video data with relatively small average GOP size relative to video data stored in the latency buffer and video data sent as part of a video stream after establishment of a connection between system 100 and remote computing device(s) 180. Accordingly, the video data stored in the retrospect buffer may have a high incidence of I-frames allowing for a granular selection of starting points for streaming video data stored in the retrospect buffer to a remote device (e.g., remote computing device(s) 180).

Process flow 192 may continue from action 170 to action 172 at which a determination may be made whether motion has been detected in the video stored in the retrospect buffer. Motion in the video may be detected in various ways using a motion detection module employed in some combination of hardware and software. For example, temporal and/or spatial differences may be detected between various frames of video data stored in the retrospect buffer. Various threshold may be employed to determine whether or not the differences in the image data between the various frames is significant enough to trigger the motion detection module to begin streaming video data to remote computing device(s) 180. In various examples, video is continually captured while motion is detected in the retrospect buffer. Accordingly, video data may be continually stored in the retrospect buffer while camera 101 is recording video 106.

If no motion is detected at action 172, processing of process flow 192 may return to action 170 and camera 101 may continue to capture video of the scene 190 and store the video data in the retrospect buffer. Video data stored in the retrospect buffer may be recorded at a particular bitrate or may be recorded as uncompressed video data (e.g., uncompressed frames) depending on the implementation. Conversely, if motion is detected in the video data stored in the retrospect buffer, the one or more processors 102 may begin storing video data captured by camera 101 in a latency buffer at action 176. Video data stored in the latency buffer may be recorded at a particular bitrate or may be recorded as uncompressed video data depending on the implementation. Additionally, in some examples, the bitrate of the video data stored in the latency buffer may be different from the bitrate of the video data stored in the retrospect buffer. The latency buffer may be used to store video data while a WebRTC connection is being established between system 100 and remote computing device(s) 180 over network 104 at action 174. As motion has been detected in the video of the retrospect buffer, the video captured while establishing a connection between system 100 and remote computing device(s) 180 may represent motion of interest to the user, as the motion detected in the retrospect buffer may be likely to continue a short time later. Therefore, at action 178 the video data in the latency buffer may be sent to remote computing device(s) 180 for further processing (e.g., human detection, pet detection, etc.) and/or to make the video data accessible by user 184. Additionally, at action 178, system 100 may send the contents of the retrospect buffer to computing device 180. The video data in the retrospect buffer may be important to show the start of the motion detected in scene 190 as well as to provide some context to a viewer of the video. Accordingly, after establishing the connection with remote computing device(s) 180 at action 174, the contents of both the latency buffer and retrospect buffer may be sent to remote computing device(s) 180. However, since, in various examples, it may take a significant amount of time to establish a connection between system 100 and remote computing device(s) 180 (e.g., between 2 and 7 seconds) video data received by remote computing device(s) 180 may be significantly delayed relative to the most recent video captured by camera 101. For example, if it takes 5 seconds to establish the connection between system 100 and remote computing device(s) 180, the video stream received by remote computing device(s) 180 may be delayed by a minimum of 7 seconds (e.g., 5 seconds for latency buffer+2 seconds for retrospect buffer). Additionally, using traditional streaming and encoding techniques, this delay may propagate for the duration of the stream. Accordingly, a viewer of the video (e.g., user 184) may be watching the video with a significant delay. Accordingly, various techniques described herein are used to accelerate streaming of video stored in the latency buffer and the retrospect buffer in order to eliminate the backlog of buffered video data, so that video data may be streamed in real-time.

In various examples, a persistent connection may be used between system 100 and remote computing device(s) 180. In such examples, a latency buffer may be reduced and/or eliminated as there may be no delay introduced as a consequence of establishing a connection between system 100 and remote computing device(s) 180. However, the various techniques described herein may still be of use when "catching up" streaming from an unexpected delay (e.g., a decrease in network throughput due to congestion) as well as to catch-up streaming after sending the contents of the retrospect buffer to remote computing device(s) 180. Additionally, in various examples, the retrospect buffer and/or the latency buffer may be sent out-of-band in order to achieve rapid catch-up to the live video stream.

Figure 2:
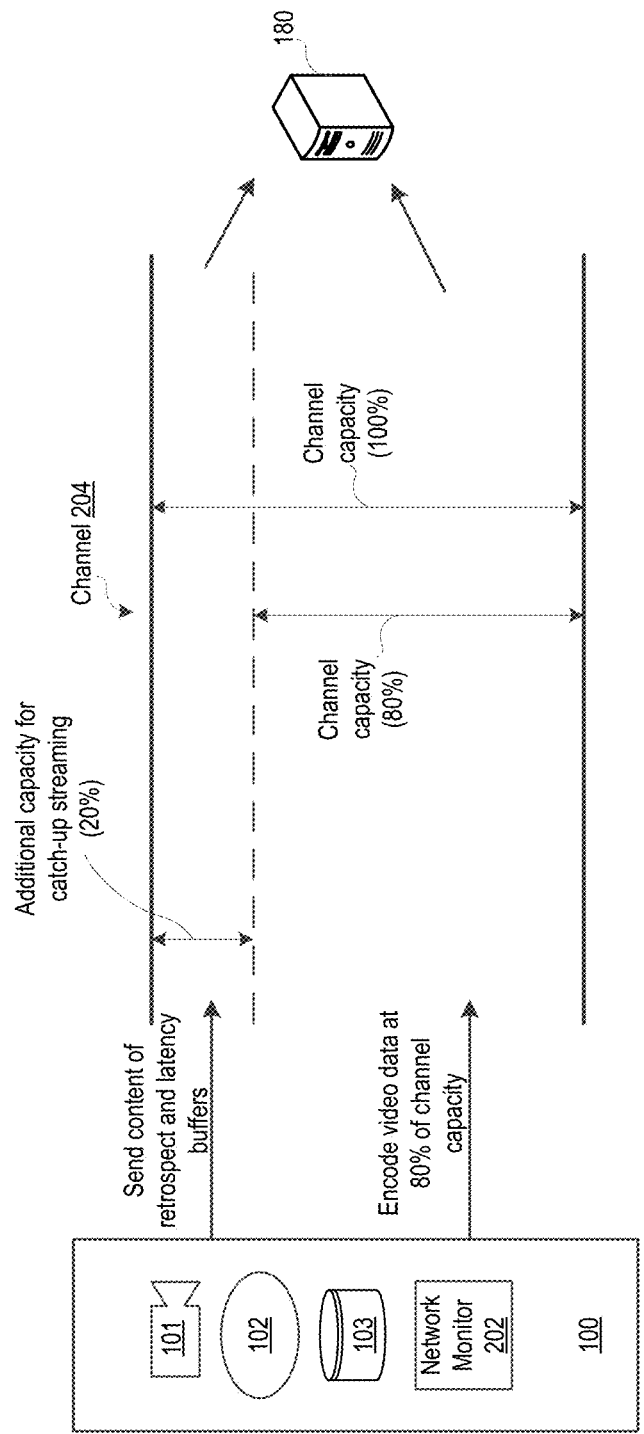
FIG. 2 depicts an example of a technique for performing catch-up pacing for video streaming, in accordance with various aspects of the present disclosure.

FIG. 2 depicts an example of a technique that may be used for catch-up video streaming, in accordance with various embodiments of the present disclosure. As depicted in FIG. 2, upon establishing a connection between system 100 and remote computing device(s) 180, system 100 may begin sending video data through channel 204 to remote computing device(s) 180. As previously described, there may be a backlog of several seconds of video data stored in the retrospect buffer and/or the latency buffer of system 100. System 100 may eliminate the backlog of buffered video data in order to achieve a live-stream or real-time stream with a minimum amount of video delay.

Accordingly, in some examples, system 100 may comprise a network monitor 202. Network monitor 202 may be programmed to monitor link capacity of channels between system 100 and remote computing device(s) 180. In various examples, network monitor 202 may use historical data of the connection between system 100 and remote computing device(s) 180 to estimate a current channel capacity between system 100 and remote computing device(s) 180. Historical data may include previous data from previous connections between system 100 and remote computing device(s) 180 and may incorporate peak congestion times, type of network environment (e.g., single family dwelling, multi-family dwelling with shared access points, etc.). Additionally, in some examples, network monitor 202 may monitor round trip time (RTT), jitter, packet loss, negative acknowledgements, etc. in order to determine a link capacity (e.g., available bandwidth) on channel 204. The one or more processors 102 may receive an indication of the current channel capacity from network monitor 202. In response, the one or more processors 102 may instruct an encoder of system 100 to generate a bitstream at a bitrate (e.g., encode video data at the bitrate) that is a percentage of the total channel capacity. For example, if the total channel capacity is 1 Mbps, the one or more processors 102 may instruct encoders to encode the video stream to be sent to remote computing device(s) 180 at 800 kbps. As a result, 20% of the capacity of channel 204 is unused and may be used for catch-up pacing. For example, packets representing frames of video data from the retrospect buffer and latency buffer may be streamed using the additional channel capacity.

In examples where the contents of the retrospect buffer and latency buffer are uncompressed, system 100 may use a faster-than-realtime encoder to encode the contents of the retrospect buffer and latency buffer. As described in further detail below, the contents of the retrospect buffer and latency buffer may be encoded at a bitrate that approximately represents the difference between the total estimated available bandwidth and a bitrate of the video data being captured by camera 101 (e.g., the currently captured video data transmitted to remote computing device(s) as a live stream). In the example above, a faster-than-realtime encoder may encode the contents of the retrospect buffer and latency buffer at 200 kbps (e.g., 1 Mbps-800 kbps). In some examples, a tolerance may be used to prevent the bit stream from exceeding the total available bandwidth in order to prevent the connection from being dropped. For example, instead of encoding the contents of the retrospect buffer and latency buffer at 200 kbps, the contents may instead be encoded at 180 kbps (a 10% reduction). A faster-than-realtime encoder may encode the uncompressed content and at the selected bitrate (e.g., ~200 kbps). Additionally, the faster-than-realtime transcoder may be effective to encode the content at a rate that exceeds the frame rate.

In examples where the contents of the retrospect buffer and latency buffer are recorded at respective first and second bitrates prior to establishing the connection with channel 204, a faster-than-realtime transrater or transcoder may be used to transcode the contents of the retrospect buffer and latency buffer at a bitrate that approximately represents the difference between the total estimated available bandwidth and a bitrate of the video data being captured by camera 101 (e.g., the currently captured video data transmitted to remote computing device(s) as a live stream). In the above example, a faster-than-realtime transcoder or transrater may encode the contents of the retrospect buffer and latency buffer at approximately 200 kbps (e.g., 1 Mbps-800 kbps). As described above, in some examples a tolerance band may be used to determine the bitrate at which to encode the contents of the retrospect and latency buffers to avoid exceeding the total channel capacity. In various examples, the tolerance band may reduce the bitrate of the retrospect and latency buffer content encoding by some percentage in order to avoid exceeding the total channel capacity. A faster-than-realtime transcoder may decompress the encoded content and recompress at a different bitrate. Additionally, the faster-than-realtime transcoder may be effective to transcode the content at a rate that exceeds the frame rate. A faster-than realtime transrater may reencode encoded content at a different bitrate by adjusting the quantization parameters of the content during rate control. Additionally, the faster-than-realtime transrater may be effective to transrate the content at a rate that exceeds the frame rate.

In various examples, when the contents of the retrospect buffer and/or latency buffer have been sent to remote computing device(s) 180, the one or more processors 102 may instruct the encoder of system 100 to generate a bit stream at a bitrate that more closely resembles or matches the full channel capacity (e.g., 1.0 Mbps in the example above). Although a 0.2× reduction in the bitrate is used in the example above, any suitable percentage reduction (e.g., ×0.25, ×0.15, etc.) in bitrate may be used in accordance with the various embodiments described herein.

Additionally, in various examples, the bitrate of the bit stream may be gradually increased as the contents of the retrospect and/or latency buffer are sent to remote computing device(s) 180. For example, the one or more processors 102 may receive an indication of the current channel capacity from network monitor 202. In response, the one or more processors 102 may instruct an encoder of system 100 to generate a bitstream at a bitrate (e.g., encode video data at the bitrate) that is a percentage of the total channel capacity. For example, if the total channel capacity is 1 Mbps, the one or more processors 102 may instruct encoders to encode the video stream to be sent to remote computing device(s) 180 at 900 kbps. As a result, 10% of the capacity of channel 204 is unused and may be used for catch-up pacing. After sending a certain percentage of the video data stored in the retrospect buffer and/or latency buffer, the video stream may be encoded at an increased bitrate (e.g., 950 kbps). For example, after sending a percentage of the video data stored in the retrospect buffer (e.g., 50%, 100% or some other percentage used for the particular implementation) the bitrate of the bitstream may be increased to a value above the initial 900 kbps bitrate. In various examples, the bitrate may be increased in a linear or stepwise manner to close the gap between the total channel capacity (e.g., available bandwidth) and the current bitrate of the video stream (e.g., video data recorded by camera 101 that is not stored in the retrospect buffer and/or latency buffer). As previously explained, the excess bandwidth may be used to transmit the video data stored in the latency buffer and/or retrospect buffer.

Additionally, in some examples, prior to motion detection, camera 101 may record video data at a first frame rate (e.g., ~15 frames-per-second). When motion is detected from video data stored in the retrospect buffer, the frame rate may be increased while the connection between system 100 and remote computing device(s) 180 is being established. For example, upon detection of motion and during the establishment of a connection, camera 101 may increase the frame rate to a second frame rate, higher than the first (e.g., ~20 frames-per-second) and may store the video data in the latency buffer. Upon establishment of a connection between system 100 and remote computing device(s) 180, camera 101 may continue to capture video data at a frame rate that is below a full-quality frame rate (e.g., 30 frames-per-second ("fps") or higher). In various examples, recording and sending video data at a frame rate that is below the full quality frame rate of camera 101 may result in a reduced bitrate of the video stream. Accordingly, if the reduced bitrate of the video stream is less than the full channel capacity by some amount, the excess amount may be used for catch-up pacing for the video data stored in the retrospect buffer and latency buffer in order to eliminate the backlog of video data and to catch the stream up to real-time. Once the backlog of video data stored in the retrospect buffer and/or latency buffer has been sent to remote computing device(s) 180, the frame rate may be increased to full quality (e.g., 30 fps in the example above). Advantageously, recording video data for the retrospect buffer and/or latency buffer at reduced frame rates may allow the size of the retrospect buffer and/or latency buffer to be minimized, which may be particularly desirable in memory constrained systems.

Similarly, in various examples, the encoder may use rate control and GOP size control to adjust the bitrate of the video stream in order to reserve a certain percentage of the bandwidth on channel 204 for catch-up pacing of video data stored in the retrospect buffer and/or the latency buffer. For examples, upon receiving an indication of current channel capacity of channel 204, an encoder of system 100 may increase the quantization parameter to reduce the size of frames of video data and accordingly reduce the bitrate preserving a certain percentage of the channel capacity for catch-up streaming. Similarly, the encoder may increase the average GOP size which may, in turn, reduce the bitrate due to the less frequent transmission of large-sized I-frames.

Figure 3:
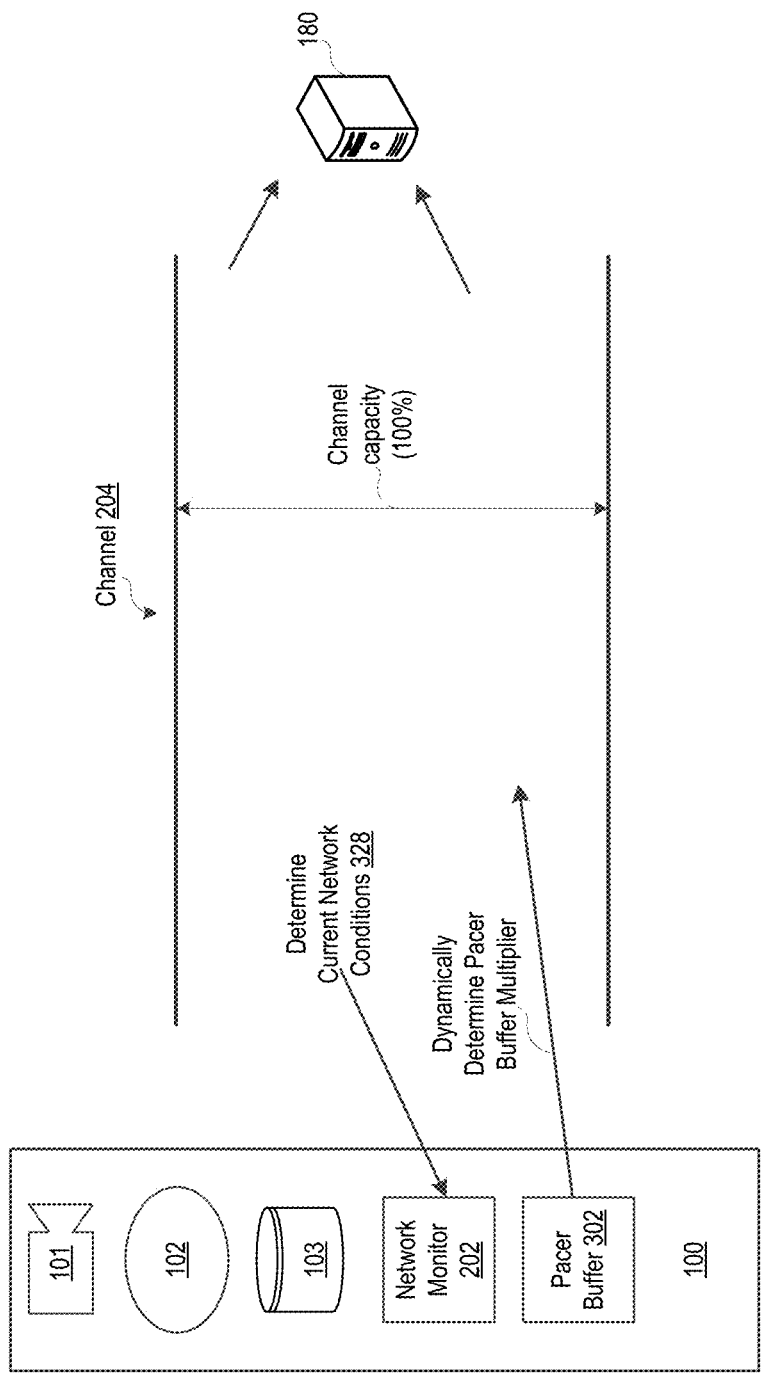
FIG. 3 depicts an example technique for dynamically adjusting a pacer buffer multiplier in order to perform catch-up pacing for video streaming, in accordance with embodiments of the present disclosure.

FIG. 3 depicts an example technique for dynamically adjusting a pacer buffer multiplier in order to perform catch-up pacing for video streaming, in accordance with embodiments of the present disclosure. In various examples, network monitor 202 may determine an indication of current network conditions of channel 204. Network monitor 202 may be programmed to monitor link capacity of channels between system 100 and remote computing device(s) 180. In various examples, network monitor 202 may use historical data of the connection between system 100 and remote computing device(s) 180 to estimate a current channel capacity between system 100 and remote computing device(s) 180. Historical data may include previous data from previous connections between system 100 and remote computing device(s) 180 and may incorporate peak congestion times, type of network environment (e.g., single family dwelling, multi-family dwelling with shared access points, etc.). Additionally, in some examples, network monitor 202 may monitor round trip time (RTT), jitter, packet loss, negative acknowledgements, etc. in order to determine a link capacity (e.g., available bandwidth) on channel 204. The one or more processors 102 may receive an indication of the current channel capacity from network monitor 202.

Pacer buffer 302 is a packet buffer effective to store packets of video data prior to transmission from system 100 to computing device(s) 180. Pacer buffer 302 may comprise a programmable multiplier effective to multiply the rate at which packets stored in pacer buffer 302 are sent over channel 204 to computing device(s) 180 relative to a default rate of sending packets from pacer buffer 302.

In various examples, the multiplier of pacer buffer 302 may be dynamically adjusted based on a current bandwidth estimation (e.g., as determined by network monitor 202) and/or the average bandwidth conditions typical for the system 100 and channel 204. As depicted in FIG. 3, network monitor 202 may determine current network conditions 328. Network monitor 202 may provide an indication of the current network conditions 328 (e.g., a current amount of available bandwidth) to the one or more processors 102. The one or more processors 102 may determine historical network conditions of channel 204. The one or more processors may determine that current network conditions and historical network conditions indicate that additional bandwidth is available for use beyond what is currently being used on channel 204. Accordingly, in the example, the one or more processors 102 may increase the multiplier of the pacer buffer 302. In various examples, the one or more processors 102 may conservatively increase the multiplier of pacer buffer 302 such that the increased traffic resulting from increasing the multiplier does not exceed the link capacity (e.g., available bandwidth) of channel 204.

Similarly, the one or more processors may determine that current network conditions and/or historical network conditions indicate that the current multiplier of pacer buffer 302 is likely to cause network traffic from system 100 to exceed the link capacity of channel 204. Accordingly, in such an example, the one or more processors 102 may decrease the multiplier of pacer buffer 302 in order to conserve bandwidth.

In various examples, internet service providers (ISP) offer so-called "boost" conditions which boost connection speed for the first few seconds upon establishment of a connection such as channel 204 between system 100 and remote computing device(s) 180. Boost is traditionally used to buffer streaming video to avoid playback interruption. However, the boosted network conditions may be used to temporarily increase the multiplier of pacer buffer 302. Thereafter, when the boost is finished, network monitor 202 may detect the decrease in available bandwidth and the multiplier of pacer buffer 302 may be decreased in order to avoid exceeding the capacity of channel 204.

Various other techniques may be used to complement the different techniques described above. For example, quantization parameter adjustment may be used to dynamically alter the bitrate during the encoding process. In various examples, higher quantization parameters may be used to encode video data stored in the retrospect buffer and/or latency buffer in order to allow system 100 to catch-up to live streaming more quickly. Additionally, temporal scalable video coding (TSVC) may be used to drop frames of encoded video data in order to maintain a compliant bitstream in the event that network conditions deteriorate (e.g., throughput declines) or packet loss increases. In various examples, TSVC may be used to produce a compliant bitstream for the recipient device (e.g., remote computing device(s) 180) to avoid dropping the video stream from channel 204.

Figure 4:
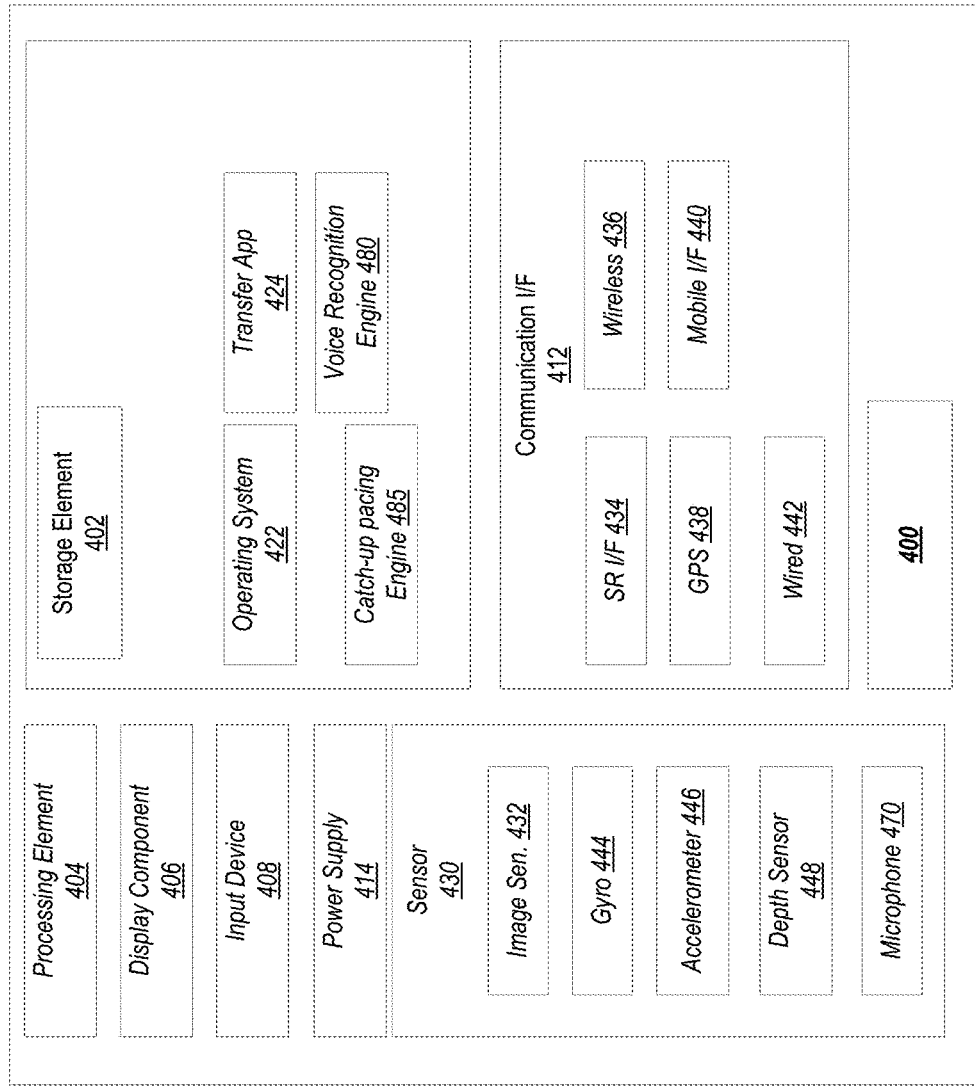
FIG. 4 is a block diagram depicting an example architecture of a computing device that may be used in accordance with various aspects of the present disclosure.

FIG. 4 is a block diagram showing an example architecture 400 of a computing device, such as the system 100 and/or remote computing device(s) 180, and/or other computing devices described herein. It will be appreciated that not all user devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). In some examples, the processing element 404 may be effective to perform object segmentation techniques for image data, as described above. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc.

The storage element 402 may also store software for execution by the processing element 404. An operating system 422 may provide the user with an interface for operating the user device and may facilitate communications and commands between applications executing on the architecture 400 and various hardware thereof. A transfer application 424 may be configured to send and/or receive image and/or video data to and/or from other devices (e.g., a mobile device, remote device, image capture device, and/or display device). In some examples, the transfer application 424 may also be configured to upload the received images to another device that may perform processing as described herein (e.g., a mobile device or another computing device).

In various examples, catch-up pacing engine 485 may be effective to control the frame rate of image sensor 432 (e.g., camera 101) in order to perform the various catch-up pacing techniques described above. Additionally, in various examples, catch-up pacing engine 485 may receive indications of current network conditions (e.g., from network monitor 202) and may adjust the multiplier of pacer buffer 302. Additionally, in some examples, catch-up pacing engine 485 may receive an indication of current network conditions and may encode video data so as to retain a percentage of available bandwidth for transmission of the retrospect buffer and/or latency buffer, as described above.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 for capturing sounds, such as voice commands. Voice recognition engine 480 may interpret audio signals of sound captured by microphone 470. In some examples, voice recognition engine 480 may listen for a "wake word" to be received by microphone 470. Upon receipt of the wake word, voice recognition engine 480 may stream audio to a voice recognition server for analysis. In various examples, voice recognition engine 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other user devices. For example, the communication interface 412 may comprise a wireless communication module 436 configured to communicate on a network, such as the network 104, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors (e.g., camera 101 depicted in FIG. 1). An image sensor 432 is shown in FIG. 4. Some examples of the architecture 400 may include multiple image sensors 432. For example, a panoramic camera system may comprise multiple image sensors 432 resulting in multiple images and/or video frames that may be stitched and may be blended to form a seamless panoramic output.

Motion sensors may include any sensors that sense motion of the architecture including, for example, gyro sensors 444 and accelerometers 446. Motion sensors, in some examples, may be used to determine an orientation, such as a pitch angle and/or a roll angle of a camera. The gyro sensor 444 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 446 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 438 may be utilized as a motion sensor. For example, changes in the position of the architecture 400, as determined by the GPS interface 438, may indicate the motion of the GPS interface 438.

In some examples, architecture 400 may include a depth sensor 448. Depth sensor 448 may be effective to determine a distance between image sensor 432 and a surface detected by depth sensor 448. In some examples, the depth sensor 448 may determine the contours of the surface and may be capable of using computer vision techniques to recognize facial patterns or other markers within the field of view of the depth sensor 448's infrared sensor. In some examples, the depth sensor 448 may include an infrared projector and camera. Processing element 404 may build a depth map based on detection by the infrared camera of a pattern of structured light displayed on a surface by the infrared projector. In some other examples, the depth sensor 448 may include a time of flight camera that may compute distance based on the speed of light by measuring the time of flight of a light signal between a camera of the depth sensor 448 and a surface of an environment. In some examples, processing element 404 may be effective to determine the location of various objects in the physical environment within the field of view of image sensor 432 based on the depth map created by the depth sensor 448. As noted above, in some examples, non-infrared depth sensors, such as passive stereo camera pairs, or non-identical camera pairs, may be used in place of, or in addition to, infrared light sources of depth sensor 448.

Figure 5:
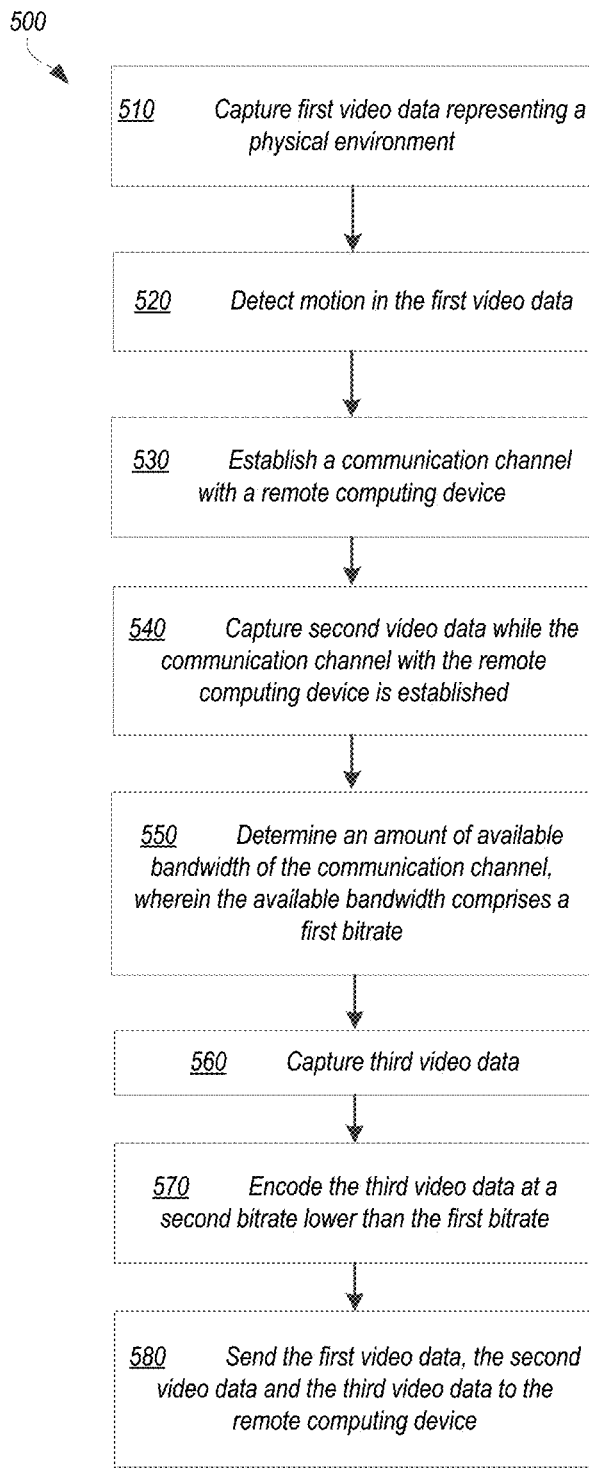
FIG. 5 depicts a flowchart illustrating an example process for performing catch-up pacing for video streaming, in accordance with various embodiments of the present disclosure.

FIG. 5 is a flowchart 500 illustrating a first example process for performing catch-up pacing for video streaming that may be used in accordance with the present disclosure. In some examples, the process of FIG. 5 may be performed by an indoor monitoring system (e.g., system 100) that sends video to one or more other computing devices (e.g., remote computing device(s) 180). In some examples, the requested video stream may be sent using a communications protocol that is commonly employed for adaptive bitrate streaming, such as hypertext transfer protocol (HTTP).

The process of FIG. 5 may begin at operation 510, "Capture first video data representing a physical environment." At operation 510, camera 101 may capture first video data representing a physical environment, such as scene 190 depicted in FIG. 1. In various examples, the first video data may be recorded at a relatively low frame rate (e.g., 15 frames-per-second, 10 frames-per-second, etc.). Additionally, in at least some examples, the first video data may be encoded using a relatively high quantization parameter, resulting in a reduced size of the compressed frames of the first video data.

The process of FIG. 5 may continue from operation 510 to operation 520, "Detect motion in the first video data." At operation 520, motion may be detected in the first video data. For example, various motion detection algorithms may detect changes (e.g., SAD, SSD, etc.) between sequential frames of image data of the first video data. The changes may be determined to exceed a threshold and may be deemed an indication of motion in the first video data.

The process of FIG. 5 may continue from action 520 to action 530, "Establish a communication channel with a remote computing device." At action 530, upon detection of motion of the first video data stored in the retrospect buffer, a communication channel may be established between the system 100 and remote computing device(s) 180.

The process of FIG. 5 may continue from action 530 to action 540, "Capture second video data while the communication channel with the remote computing device is established." In the example, second video data may be captured while the connection is being established with remote computing device(s) 180. In some examples, the second video data may be recorded at a lower frame rate relative to a default streaming frame rate. In some further examples, the second video data may be recorded at a higher frame rate relative to the first video data, but at a frame rate that is still lower than a default frame rate for live streaming video from system 100 to remote computing device(s) 180.

The process of FIG. 5 may continue from action 540 to action 550, "Determine an amount of available bandwidth of the communication channel, wherein the available bandwidth comprises a first bitrate." At action 550 system 100 may determine an indication of available bandwidth and/or current network conditions on the communication channel established between system 100 and remote computing device(s) 180. In various examples, network monitor 202 of system 100 may determine the current network conditions. In some examples, determining the current network conditions may comprise determining an available bandwidth comprising a bitrate at which data may be transmitted over the communication channel. The available amount of bandwidth may be determined using a remote estimated maximum bandwidth (REMB) message, based on historical conditions, based on acknowledgement time of sent data, etc.

The process of FIG. 5 may continue from action 550 to action 560, "Capture third video data." At action 560 third video data may be captured by camera 101. The third video data may be captured after the communication channel has been established between system 100 and remote computing device(s) 180. In some examples, the third video data may be captured at the full default frame rate (e.g., 30 frames-per-second, 60 frames-per-second, etc.).

The process of FIG. 5 may continue from action 560 to action 570, "Encode the third video data at a second bitrate lower than the first bitrate." At action 570, the third video data may be encoded at a second bitrate lower than the first bitrate. In various examples, the third video data may be encoded at a bitrate that is lower than the available bandwidth so that the first video data stored in the retrospect buffer and the second video data stored in the latency buffer can be transmitted to the remote computing device(s) 180 to eliminate the lag in the live stream.

The process of FIG. 5 may continue from action 570 to action 580, "Send the first video data, the second video data, and the third video data to the remote computing device." At action 580, the first video data, the second video data and the third video data may be sent over the communication channel to the remote computing device(s) 180.

Figure 6:
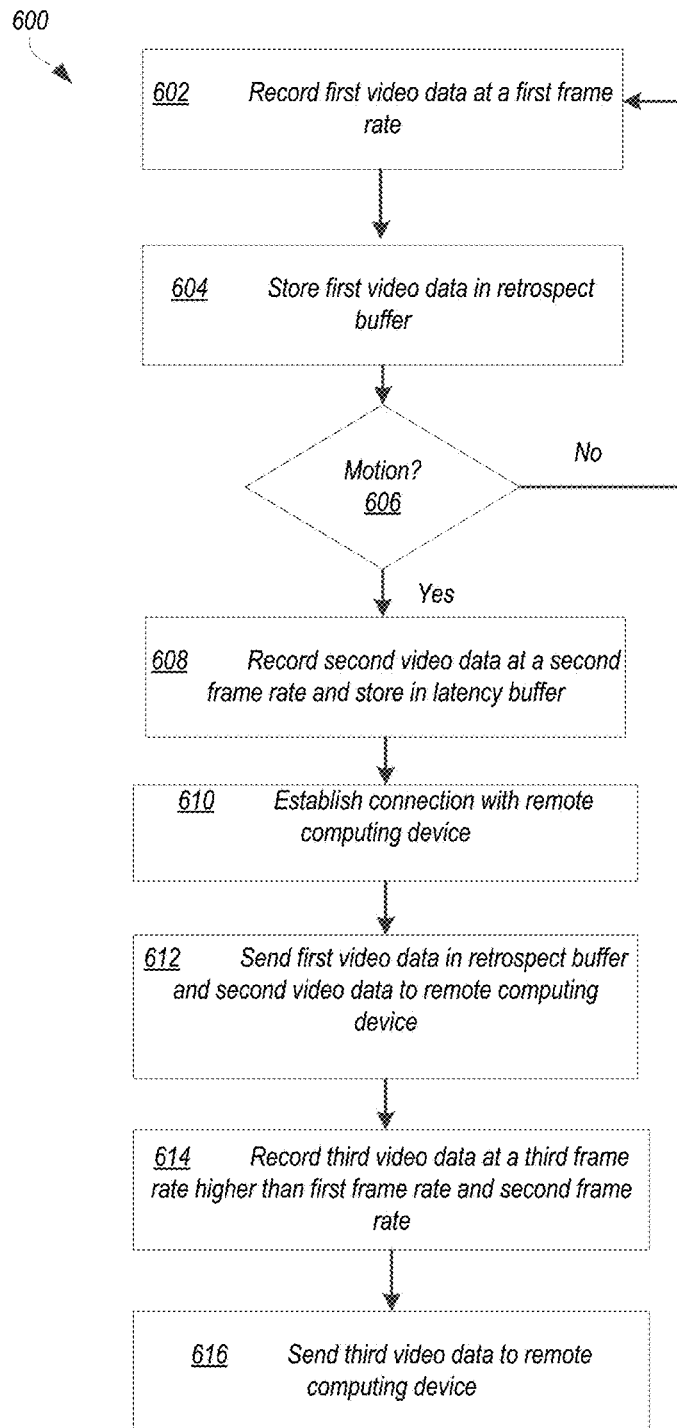
FIG. 6 depicts a flowchart illustrating another example process for catch-up pacing for video streaming, in accordance with embodiments of the present disclosure.

FIG. 6 is a flowchart 600 illustrating a first example process for performing catch-up pacing for video streaming that may be used in accordance with the present disclosure. In some examples, the process of FIG. 6 may be performed by an indoor monitoring system (e.g., system 100) that sends video to one or more other computing devices (e.g., remote computing device(s) 180). In some examples, the requested video stream may be sent using a communications protocol that is commonly employed for adaptive bitrate streaming, such as hypertext transfer protocol (HTTP).

The process of FIG. 6 may begin at action 602, "Record first video data at a first frame rate." At action 602, first video data may be recorded by camera 101 at a first frame rate. In some examples, the first frame rate may be relatively low (e.g., 15 frames-per-second, 20 frames-per-second, etc.) compared to a default frame rate for streaming video frame system 100.

The process of FIG. 6 may continue from action 602 to action 604, "Store first video data in a retrospect buffer". At action 604, the first video data may be stored in a retrospect buffer of system 100. In various examples, the retrospect buffer may be relatively small in terms of memory size. For example, the retrospect buffer may be sized so as to hold a small portion of video data (e.g., ~60 frames of video data, ~30 frames of video data, <120 frames of video data, etc.). In some examples, the oldest frames of video data stored in the retrospect buffer may be replaced by newly captured frames of video data until motion is detected in the video data in the retrospect buffer at action 606. If no motion is detected the camera may continue to capture the first video data at the first frame rate and may store the first video data in the retrospect buffer.

If, at action 606, motion is detected in the first video data stored in the retrospect buffer, the process of FIG. 6 may continue from action 606 to action 608, "Record second video data at a second frame rate and store in latency buffer." At action 608, second video data may be recorded at a second frame rate higher than the first frame rate. In various examples, the second frame rate may be below a default video streaming frame rate for system 100. For example, at action 608, the frame rate of captured video data may be increased from 15 fps to 20 fps. The second video data recorded at the second frame rate may be stored in a latency buffer.

The process of FIG. 6 may continue from action 608 to action 610, "Establish connection with remote computing device." At action 610, system 100 may establish a communication channel with a remote computing device. For example, system 100 may establish communication channel 204 with remote computing device(s) 180.

The process of FIG. 6 may continue from action 610 to action 612, "Send first video data in retrospect buffer and second video data to remote computing device." At action 612, first video data in the retrospect buffer and the second video data in the latency buffer may be sent to the remote computing device. In some examples, the first video data and the second video data may be sent out-of-band with respect to the rest of the video stream sent from system 100 to remote computing device(s) 180. In other examples, at least one processor 102 of system 100 may encode the bitstream of the video sent to remote computing device(s) 180 with a bitrate that is less than the total channel capacity of the communication channel between system 100 and remote computing device(s) 180. Accordingly, the unused channel capacity may be used to transmit the first video data from the retrospect buffer and the second video data from the latency buffer to eliminate lag in the live stream of video. In some further examples, a multiplier of a packet buffer such as a pacer buffer may be increased (if the current network conditions allow) in order to increase the rate at which packets are sent from system 100 to remote computing device(s) 180.

The process of FIG. 6 may continue from action 612 to action 614, "Record third video data at a third frame rate higher than first frame rate and second frame rate." At action 614, system 100 may record third video data at a third frame rate that is higher than the first frame rate and the second frame rate. In some examples, the third frame rate may represent a default frame rate for video streamed between system 100 and remote computing device(s) 180.

The process of FIG. 6 may continue from action 614 to action 616, "Send third video data to remote computing device." At action 616, the third video data may be streamed to the remote computing device. As previously described, in various examples, the third video data may be encoded at a bitrate that is less than the total available bandwidth of the communication channel in order to conserve available bandwidth for sending the contents of the retrospect buffer and/or latency buffer.

Figure 7:
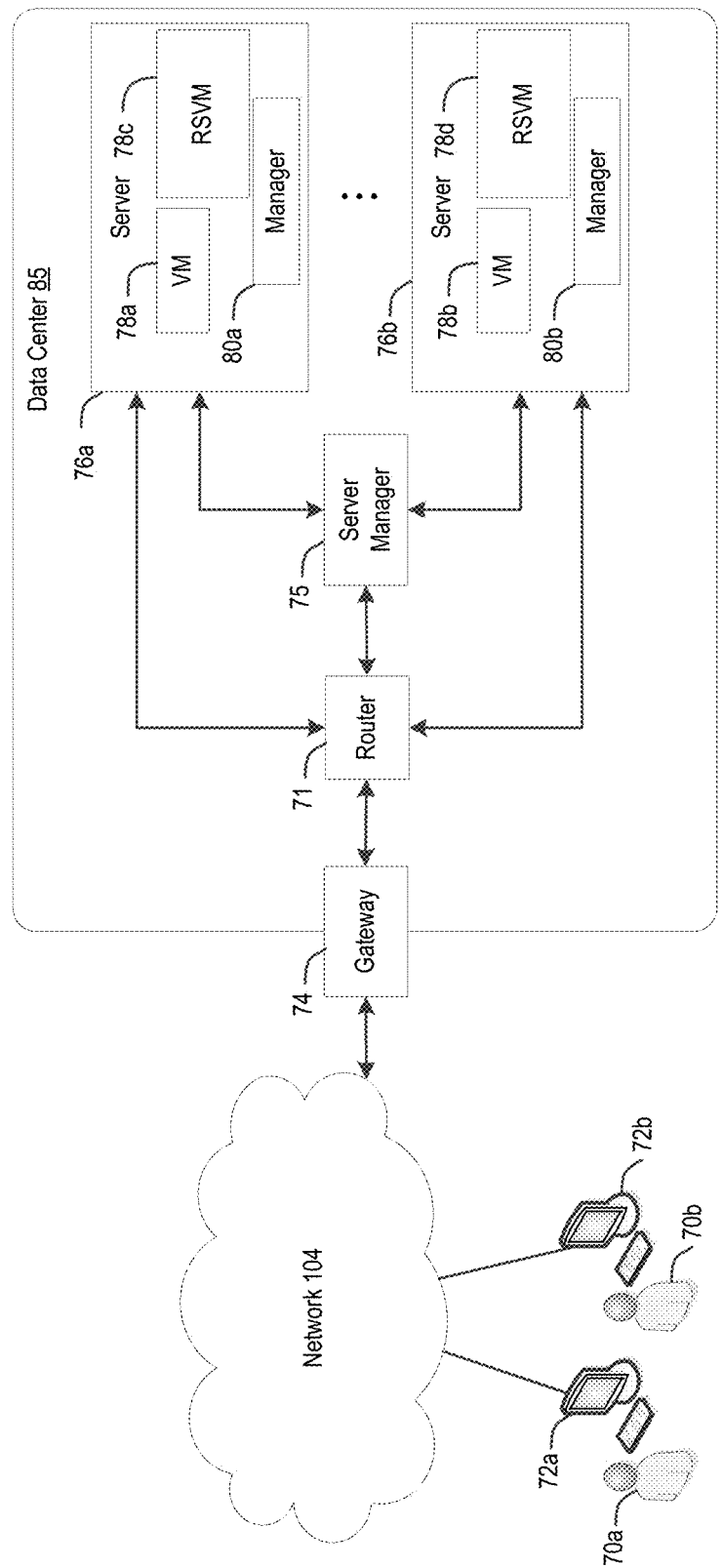
FIG. 7 depicts an example system for sending and providing data over a network, in accordance with various embodiments of the present disclosure.

An example system for sending and providing data will now be described in detail. In particular, FIG. 7 illustrates an example computing environment in which the embodiments described herein may be implemented. FIG. 7 is a diagram schematically illustrating an example of a data center 85 that can provide computing resources to users 70a and 70b (which may be referred herein singularly as user 70 or in the plural as users 70) via user computers or other network-connected devices 72a and 72b (which may be referred herein singularly as computer 72 or in the plural as computers 72) via network 104. In various examples, system 100 depicted in FIG. 1 may be an example of a computer or other network-connected device 72a and/or 72b. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory, and/or large storage capacity—and small resources—consisting of fewer processors, smaller amounts of memory, and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). Virtual machine instances 78c and 78d may be rendition switching virtual machine ("RSVM") instances. The RSVM virtual machine instances 78c and 78d may be configured to perform all, or any portion, of the techniques for rendition switching between different renditions of a video and/or any other of the disclosed techniques in accordance with the present disclosure and described in detail above. As should be appreciated, while the particular example illustrated in FIG. 7 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to network 104. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of lower latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another, or may be combined in various ways. All possible combinations and subcombinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A method of catch-up pacing for video streaming, comprising:
   capturing, with a camera of an indoor monitoring device, first video data over a first time period, the first video data representing a physical environment;
   storing the first video data in a retrospect buffer;
   determining, by at least one processor of the indoor monitoring device, that there is no indication of motion in the physical environment present in the first video data;
   capturing, with the camera, second video data over a second time period following the first time period, the second video data representing the physical environment;
   storing the second video data in the retrospect buffer;
   determining, by the at least one processor, an indication of motion in the physical environment present in the second video data;
   establishing a communication channel between the indoor monitoring device and a remote computing device;
   capturing, with the camera, third video data over a third time period, wherein the third time period corresponds to a time after the indication of motion in the physical environment is determined and before the communication channel is established between the indoor monitoring device and the remote computing device;
   storing the third video data in a latency buffer of the indoor monitoring device;
   determining a first bitrate corresponding to a first available amount of bandwidth of the communication channel;
   capturing, with the camera, fourth video data over a fourth time period, wherein the fourth time period is after the third time period;
   encoding the fourth video data at a second bitrate to generate encoded fourth video data, wherein the second bitrate comprises a predetermined proportion of the first available amount of bandwidth;
   determining a third bitrate by determining a difference between the first bitrate and the second bitrate;
   sending the encoded fourth video data to the remote computing device;
   encoding the second video data and the third video data at a fourth bitrate that is less than or equal to the third bitrate; and
   sending the second video data and the third video data over the communication channel to the remote computing device.

2. The method of claim 1, further comprising:
   capturing, with the camera, the first video data and the second video data at a first frame rate;
   capturing, with the camera, the third video data at a second frame rate, the second frame rate higher than the first frame rate; and
   capturing, with the camera, the fourth video data at a third frame rate, the third frame rate higher than the second frame rate.

3. The method of claim 1, further comprising:
   generating a plurality of packets from the fourth video data;
   storing the plurality of packets in a pacer buffer for transmission to the remote computing device;
   determining a second available amount of bandwidth, the second available amount of bandwidth being higher than the first amount of available bandwidth; and
   increasing a pacer buffer multiplier, wherein the pacer buffer multiplier is effective to increase a rate at which the plurality of packets are sent over the communication channel.

4. A method comprising:
   capturing, with a camera of an electronic device, first video data representing a portion of a physical environment;
   storing the first video data in a first buffer of the electronic device;
   detecting a triggering event using the first video data;
   establishing a communication channel between the electronic device and a remote computing device;
   capturing, with the camera, second video data, wherein the second video data is captured during establishing of the communication channel;
   storing the second video data in a second buffer of the electronic device;
   determining an estimated available bandwidth of the communication channel, wherein the estimated available bandwidth comprises a first bitrate;
   capturing, with the camera, third video data;
   encoding the third video data at a second bitrate to generate encoded third video data, the second bitrate being lower than the first bitrate;
   determining a third bitrate by determining a difference between the first bitrate and the second bitrate;
   sending the encoded third video data to the remote computing device;

encoding the first video data and the second video data at a fourth bitrate that is less than or equal to the third bitrate, and sending the first video data and the second video data to the remote computing device.

5. The method of claim 4, further comprising:

capturing the first video data at a first frame rate; and capturing the third video data at a second frame rate higher than the first frame rate.

6. The method of claim 5, further comprising capturing the second video data at a third frame rate, wherein the third frame rate is higher than the first frame rate and lower than the second frame rate.

7. The method of claim 4, wherein a first average group of pictures (GOP) size of the first video data in the first buffer is less than a second average GOP size of the second video data in the second buffer.

8. The method of claim 4, further comprising:

after sending the first video data to the remote computing device and before completion of the sending the second video data to the remote computing device, encoding fourth video data at a fifth bitrate to generate encoded fourth video data, the fifth bitrate being higher than the second bitrate and lower than the first bitrate; and sending the encoded fourth video data to the remote computing device.

9. The method of claim 4, further comprising:

capturing, with the camera, fourth video data, wherein the fourth video data is captured after sending the first video data and the second video data to the remote computing device;

encoding the fourth video data at the first bitrate to generate encoded fourth video data; and sending the encoded fourth video data to the remote computing device.

10. The method of claim 4, wherein the communication channel is a first communication channel, the method further comprising:

sending the encoded third video data to the remote computing device on the first communication channel; and sending at least one of the first video data or the second video data to the remote computing device on a second communication channel different from the first communication channel.

11. The method of claim 4, further comprising:

generating a plurality of packets from the encoded third video data;

storing the plurality of packets in a third buffer;

determining a second estimated available bandwidth of the communication channel, the second estimated available bandwidth comprising a third bitrate higher than the first bitrate; and increasing a rate at which the plurality of packets are sent from the third buffer to the remote computing device over the communication channel.

12. The method of claim 4, further comprising:

generating a first compressed frame of the first video data using a first quantization parameter;

generating a second compressed frame of the third video data using a second quantization parameter, wherein the second quantization parameter is lower than the first quantization parameter; and sending the first compressed frame and the second compressed frame to the remote computing device.

13. An electronic device, comprising:

a camera;

at least one processor; and a memory effective to store instructions, wherein the instructions when executed by the at least one processor are effective to cause the at least one processor to perform a method comprising:

receiving, from the camera, first video data representing a portion of a physical environment;

storing the first video data in a first buffer;

detecting a triggering event using the first video data;

establishing a communication channel between the electronic device and a remote computing device;

receiving, from the camera, second video data, wherein the second video data is captured during establishing of the communication channel;

storing the second video data in a second buffer;

determining an estimated available bandwidth of the communication channel, wherein the estimated available bandwidth comprises a first bitrate;

receiving, from the camera, third video data;

encoding the third video data at a second bitrate to generate encoded third video data, the second bitrate being lower than the first bitrate;

determining a third bitrate by determining a difference between the first bitrate and the second bitrate;

sending the encoded third video data to the remote computing device;

encoding the first video data and the second video data at a fourth bitrate that is less than or equal to the third bitrate, and sending the first video data and the second video data to the remote computing device.

14. The electronic device of claim 13, wherein the instructions when executed by the at least one processor are effective to cause the at least one processor to perform the method further comprising:

controlling the camera to capture the first video data at a first frame rate; and controlling the camera to capture the third video data at a second frame rate higher than the first frame rate.

15. The electronic device of claim 14, wherein the instructions when executed by the at least one processor are effective to cause the at least one processor to perform the method further comprising:

controlling the camera to capture the second video data at a third frame rate, wherein the third frame rate is higher than the first frame rate and lower than the second frame rate.

16. The electronic device of claim 15, wherein a first average group of pictures (GOP) size of the first video data in the first buffer is less than a second average GOP size of the second video data in the second buffer.

17. The electronic device of claim 13, wherein the instructions when executed by the at least one processor are effective to cause the at least one processor to perform the method further comprising:

receiving, from the camera, fourth video data, wherein the fourth video data is captured after sending the first video data and the second video data to the remote computing device;

encoding the fourth video data at the first bitrate to generate encoded fourth video data; and sending the encoded fourth video data to the remote computing device.

18. The electronic device of claim 13, wherein the communication channel is a first communication channel and wherein the instructions when executed by the at least one processor are effective to cause the at least one processor to perform the method further comprising:

sending the encoded third video data to the remote computing device on the first communication channel; and sending at least one of the first video data or the second video data to the remote computing device on a second communication channel different from the first communication channel.

19. The electronic device of claim 13, wherein the instructions when executed by the at least one processor are effective to cause the at least one processor to perform the method further comprising:

generating a plurality of packets from the encoded third video data;

storing the plurality of packets in a third buffer;

determining a second estimated available amount of bandwidth, the second estimated amount of bandwidth comprising a third bitrate higher than the first bitrate; and increasing a rate at which the plurality of packets are sent from the third buffer to the remote computing device over the communication channel.

20. The electronic device of claim 13, wherein the instructions when executed by the at least one processor are effective to cause the at least one processor to perform the method further comprising:

generating a first compressed frame of the first video data using a first quantization parameter;

generating a second compressed frame of the third video data using a second quantization parameter, wherein the second quantization parameter is lower than the first quantization parameter; and sending the first compressed frame and the second compressed frame to the remote computing device.

* * * * *